United States Patent
Chen et al.

(10) Patent No.: US 6,574,067 B2
(45) Date of Patent: Jun. 3, 2003

(54) OPTIMALLY DESIGNED PARSIMONIOUS REPETITIVE LEARNING COMPENSATOR FOR HARD DISC DRIVES HAVING HIGH TRACK DENSITY

(75) Inventors: YangQuan Chen, Singapore (SG); MingZhong Ding, Singapore (SG); LinCheng Xiu, Singapore (SG); KianKeong Ooi, Singapore (SG); LeeLing Tan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 246 days.

(21) Appl. No.: 09/759,754

(22) Filed: Jan. 12, 2001

(65) Prior Publication Data

US 2001/0043427 A1 Nov. 22, 2001

Related U.S. Application Data

(60) Provisional application No. 60/184,932, filed on Feb. 25, 2000.

(51) Int. Cl.⁷ .............................................. G11B 5/596
(52) U.S. Cl. ..................................................... 360/77.04
(58) Field of Search ............................... 360/77.04, 75, 360/77.08, 77.02

(56) References Cited

U.S. PATENT DOCUMENTS

| | | | |
|---|---|---|---|
| 5,550,685 A | * 8/1996 | Drouin | .................... 360/77.08 |
| 5,886,846 A | 3/1999 | Pham et al. | |
| 5,926,338 A | 7/1999 | Jeon et al. | |
| 5,978,169 A | 11/1999 | Woods | |
| 6,437,936 B1 | 8/2002 | Chen et al. | |
| 6,487,035 B1 | * 11/2002 | Liu et al. | .................. 360/77.04 |
| 6,510,017 B1 | * 1/2003 | Abdelnour | ............... 360/77.04 |

FOREIGN PATENT DOCUMENTS

WO     WO 93/06595     4/1993

* cited by examiner

*Primary Examiner*—Andrew L. Sniezek
(74) *Attorney, Agent, or Firm*—Westman, Champlin & Kelly, P.A.

(57) ABSTRACT

A repetitive learning compensator for a servo system of a disc drive includes a memory buffer having a length N/m where N is the number of servo sectors in a track, m is a parsing factor greater than 1 and N/m is an integer. A down sampler supplies servo signals containing error signals to the repetitive learning compensator at a frequency of $f_s/m$, where $f_s$ is a sampling frequency based on N and a fundamental frequency $f_0$ of the spindle motor. An up sampler supplies filtered signals from the repetitive learning compensator to the actuator assembly at the sampling frequency $f_s$. One aspect of the disclosure includes tuning the repetitive learning compensator with a phase advance represented by $N_{PA}$ and a cutoff frequency $f_c$, where $N_{PA}$ and $f_c$ are selected as a pair to provide the greatest transfer function amplitude at the harmonic frequencies for the repetitive learning compensator.

20 Claims, 6 Drawing Sheets

OPTIMALLY DESIGNED PARSIMONIOUS REPETITIVE LEARNING COMPENSATOR FOR HARD DISC DRIVES HAVING HIGH TRACK DENSITY

CROSS-REFERENCE TO RELATED APPLICATION

This application claims priority of Provisional Application No. 60/184,932 filed Feb. 25, 2000 by YangQuan Chen, MingZhong Ding, LinCheng Xiu, KianKeong Ooi and LeeLing Tan, for "Optimally Designed Parsimonious Repetitive Learning Compensator For Hard Disk Drives Having High Track Density".

FIELD OF THE INVENTION

This invention relates to servo control systems for disc drives, and particularly to repetitive learning compensators (RPCs) for disc drive servo systems.

BACKGROUND OF THE INVENTION

Accurate positioning of a read/write head relative to a disc medium is crucial to the operation of disc drive systems. To reliably read data from or write data to the disc surface, the read and write transducers of the head must be positioned precisely over the center of the track of the media surface from which data is read or on which data is written. A servo system operates the actuator arm assembly on which the head is mounted to position the head relative to the track so the read or write transducer, as the case may be, is centered on the track. Failure to accurately position the read/write head over the desired track during a read operation may result in unreliable data retrieval. Improper positioning of the read/write head during a write operation may result in the loss of the data being written, and in overwriting and destroying data on adjacent tracks.

A growing need for more data storage capacity has resulted in increased track density, thus increasing the number of tracks per radial inch (TPI) on the disc. As track density increases, the track width decreases, requiring head positioning to be even more accurate. Consequently, the servo system must be designed for highly precise head position control.

There are many control schemes used in servo systems of hard disc drives. Most disc drives employ a proportional-integral-derivative (PID) or state-feedback (SFB) controller for major control operations. To enhance the servo performance, adaptive and robust schemes are also used as feedforward loops. Examples of servo systems employing feedforward loops include model reference control, adaptive feedforward cancellation (AFC), proximate time optimal servomechanism (PTOS), iterative learning control (ILC), command shaping, repetitive learning compensators (RLC), and others.

Repetitive learning compensators (also called "repetitive learning controllers" or "RLCs") are implemented in code to reject repetitive disturbances, such as repeatable runout (RRO). Examples of sources of RRO include disturbances associated with the spindle motor, and written-in RRO which is a special repetitive disturbance having a fundamental frequency equal to the spindle frequency.

Some RLCs employ a positive feedback of the output of a delay line to form a filter that cancels the repeatable disturbances at frequencies which are integer multiples (harmonics) of a fundamental frequency $f_0$ that is based on the disc rotation. More particularly, for a drive spindle motor speed of RPM, the fundamental frequency $f_0$ is equal to RPM/60. Typically the filter is a digital filter-in-the form of a memory buffer, the length of which is based on a ratio of a sample frequency $f_s$ and the fundamental frequency $f_0$. Most RLCs employ a comb filter, which exhibits an infinite number of spikes or comb teeth to amplify signals at frequencies that are multiples (harmonics) of the fundamental frequency. In a feedback control system, this selective signal amplification at specified frequencies can be used to attenuate disturbances at harmonics of the fundamental frequency. Consequently, a high-gain control is achieved at these frequencies.

In hard disc drive servo controls, it is often necessary to cancel multiple harmonics of the spindle motor. Consequently, not only must the fundamental harmonic (1×) be cancelled, but also 2×, 3×, 4× and so on. The adaptive feedforward compensation (AFC) can selectively cancel the RRO of different harmonic frequencies, for example, 1×, 3×, 5× etc., but the AFC is computationally more complex and expensive to implement. The RLC, on the other hand, is relatively simple to implement.

FIG. 1 illustrates one form of repetitive learning compensator (RLC) according to the prior art. Plant 80 is driven by a servo signal r and is subject to external repetitive disturbances. In a disc drive, plant 80 is the actuator assembly that includes an actuator arm driven by a voice coil motor to position a read/write head relative to the disc medium. The read/write head reads data from the disc and returns information concerning track positioning to summing node 81 where it modifies the input servo signal. A general filter 82 contains a low pass filter, known as Q-filter, and a memory buffer. The Q-filter provides a response $Q(z^{-1})$ to shape the ideal internal model $G_{r0}(z^{-1})$, where $$G_{r0}(z^{-1}) = \frac{1}{1-z^{-N}}.$$

The memory buffer has a length N equal to the number of servo sectors on a track on the disc medium. More particularly, the sample frequency fs is the fundamental frequency $f_0$ multiplied by the number n of servo sectors on the disc track, $fs=n \cdot f_0$, so N=n.

Feedback controller 84 provides a response $C(z^{-1})$. In the control system shown in FIG. 1, the input signal, as modified by the signal from the head in plant 80, is applied to filter 82 and is summed with the output from filter 82 at summing node 83 for input to feedback controller 84. In other forms of RLCs, the output of summing node 83 is coupled to the input to filter 82 to form a loop with filter 82, so that the filter input comprises the modified input signal summed with the filter output. In either case, filter 82 samples a modified input signal over a sampling period $T_s$ based on the number of embedded servo sectors in a track. The shaped internal model of filter 82 is $$G_r(z^{-1}) = \frac{1}{1 - Q(z^{-1})z^{-N}}.$$

In practice, the Q-filter in block 82 is used to restrict the bandwidth of the RLC because the maximal frequency of interest is far lower than the Nyquest frequency $f_n$, which is half of the sampling frequency $f_s$.

In FIG. 1, filter 82 is placed before feedback controller 84. The RLC may also implemented as shown in FIG. 2 with summing node 83 after the feedback controller 84. The internal models of the RLC of FIGS. 1 and 2 are similar.

Plant 80 is subject to external repetitive disturbances known as torque level disturbance denoted by $d_T$ and positional level denoted by dp. The RLC has a filter transfer function of $H(z^{-1})$ determined by analyzing the RLC stability condition using the plant model. Considering the torque level repetitive disturbance $d_T$ and the positional level repetitive disturbance dp, the feedback controller 84 can be designed independently of the RLC. The RLC is employed to enhance the control performance of rejecting repetitive disturbances.

The ability of the RLC to reject disturbances is characterized by a disturbance rejection transfer function $G_{dy}(z^{-1})$ and a sensitivity function $S(z^{-1})$. These are given by $$G_{dy}(z^{-1}) = \frac{y}{d_r} = \frac{P(z^{-1})}{1+C(z^{-1})P(z^{-1})} = P(z^{-1})S(z^{-1}) = \frac{T(z^{-1})}{C(z^{-1})} = \frac{1-S(z^{-1})}{C(z^{-1})}, \quad [1]$$

and $$S(z^{-1}) = \frac{y}{d_p} = \frac{1}{1+C(z^{-1})P(z^{-1})} = 1 - T(z^{-1}), \quad [2]$$

where $T(z^{-1})$ is the complementary sensitivity function. In a nominal closed loop system, $$G_{cn}(z^{-1}) = \frac{C(z^{-1})P_n(z^{-1})}{1+C(z^{-1})P_n(z^{-1})} = T_n(z^{-1}) = 1 - S_n(z^{-1}). \quad [3]$$

Consequently, the output, y, of the filter shown in FIG. 2 can be represented as $$y = \frac{Pd_r + d_p}{1+CP+G_rP}, \quad [4]$$

where γ is the RLC gain. Therefore, $$G_r(z^{-1}) = \gamma \frac{Q(z^{-1})z^{-N}}{1-Q(z^{-1})z^{-N}} H(z^{-1}). \quad [5]$$

The stability condition of the RLC is modeled in FIG. 3 applying the small gain theorem with $|Q(z^{-1})z^{-N}| \leq 1$, where $\forall \omega \leq 2\pi f_n$. Consequently, RLC stability condition may be expressed as $$|1 - \gamma G_{dy}(z^{-1})H(z^{-1})| \cdot |Q(z^{-1})| < 1, \quad [6]$$

where $\forall \omega \leq 2\pi f_n$ and $z = e^{j2\pi f/f_s}$.

If the Q-filter in block 82 is set to 1, it is not practical to satisfy the RLC stability condition. The Q-filter makes the RLC more robust at the cost of reducing the ability to reject higher harmonics above the cut-off frequency of Q-filter, which is usually a low-pass filter.

The filter transfer function $H(z^{-1})$ also plays an important role in RLC stability. Therefore, the major task in designing an RLC is to determine the transfer function $H(z^{-1})$. A conventional approach is to make $H(z^{-1}) \approx G^{-1}_{dy}(z^{31\ 1})$. This is done in zero phase error tracking controllers by inverting the stably-invertable part of $G_{dy}$ while maintaining the DC gain unchanged. However, this approach is quite model involved and the feedback controller 84 may need to be re-designed accordingly.

There are numerous problems in designing conventional RLCS. More particularly, the feedback controller should not be altered, and nominal performance in the absence of disturbances should be preserved. In many cases, N may be too large to be applicable in time-critical and memory-critical applications. The filter transfer function design $H(z^{-1})$ is heavily dependent on the plant model information. The Q-filter may introduce peaking frequency drift from the ideal harmonic frequencies. This means that the disturbance attenuation at the ideal harmonic frequencies may significantly worsen. The present invention provides a solution to these and other problems, and offers other advantages over the prior art.

SUMMARY OF THE INVENTION

According to the present invention, a repetitive learning compensator is provided for a disc drive servo system. The repetitive learning compensator includes a memory buffer having a length N/m where N is the number of servo sectors in a track on the disc storage medium and m is an integer greater than one representing a parsing factor. A down sampler samples the servo signal, as modified by position error signals from the disc drive head, and supplies samples of the modified servo signal to the repetitive learning compensator at a frequency of $f_s/m$, where $f_s$ is a sampling frequency based on N and a fundamental frequency $f_0$ associated with rotation of the disc medium. An up sampler supplies filtered signals from the repetitive learning compensator to the actuator assembly at the sampling frequency $f_s$.

In preferred embodiments of the invention, the repetitive learning compensator is tuned with a phase advance represented by $N_{PA}$ and a cutoff frequency $f_c$. $N_{PA}$ and $f_c$ are selected as a pair that provides the greatest transfer function magnitude for the repetitive learning compensator.

In preferred forms of the repetitive learning compensator, the Q-filter of the repetitive learning compensator is further tuned to a learning gain γ and with a phase change for position error represented by N'. γ and N' are selected empirically from plotted stability regions associated with pluralities of γ and N'.

Another aspect of the invention is a process of attenuating error signals in a servo signal recovered from servo sectors on a storage medium at a sample frequency $f_c$. The servo signal is down-sampled at a frequency equal to fc/m, where m is a parsing factor greater than 1, N is the number of servo sectors on a track on the storage medium, and N/m is an integer. The down-sampled servo signal is filtered using a memory buffer having a length of N/m bits to attenuate error signals in the servo signal. The filtered servo signal is then up-sampled to the sample frequency $f_c$.

In other preferred embodiments, the values of m, $N_{PA}$ and N' are selected as $1 < m \leq 4$, $1 \leq N_{PA} \leq 4$ and $1 \leq N' \leq 4$.

Another aspect of the invention is in a process of designing an optimal repetitive learning compensator for a servo control of a disc drive. The number N of servo sectors in a track on the disc medium of the disc drive is identified, and a frequency is identified based on the rotational speed of the storage medium. A parsing factor m is selected, where m is greater than 1 and N/m is an integer. A memory buffer having a length equal to N/m is tuned by selecting a plurality of phase change integers $N_{PA}$ that operate on the repetitive learning compensator to alter its phase. The optimal cutoff frequency $f_c$ for the repetitive learning compensator is identified for each $N_{PA}$. Each pair, consisting of a phase change integer and corresponding optimal cutoff frequency, tunes the repetitive learning compensator to produce a transfer function. The repetitive learning compensator is tuned using the one phase change integer and its corresponding optimal cutoff frequency that produce the greatest transfer function magnitude.

In accordance with preferred embodiments of this form of the invention, the servo system is responsive to position error signals from the actuator assembly to supply modified servo signals to the repetitive learning compensator. The repetitive learning compensator is further tuned by selecting a plurality of position error phase change integers N' associated with the position error signals. A plurality of learning gains γ are selected for the repetitive learning compensator, and a plurality of stability curves are plotted for the repetitive learning compensator based on the selected pluralities of position error phase change integers and learning gains. The repetitive learning compensator is further tuned with the position error phase change integer and the learning gain associated with the one curve having the largest stability region.

Other features and benefits that characterize the present invention will be apparent upon reading the following detailed description and review of the associated drawings.

DETAILED DESCRIPTION OF ILLUSTRATIVE EMBODIMENTS

Figure 4:
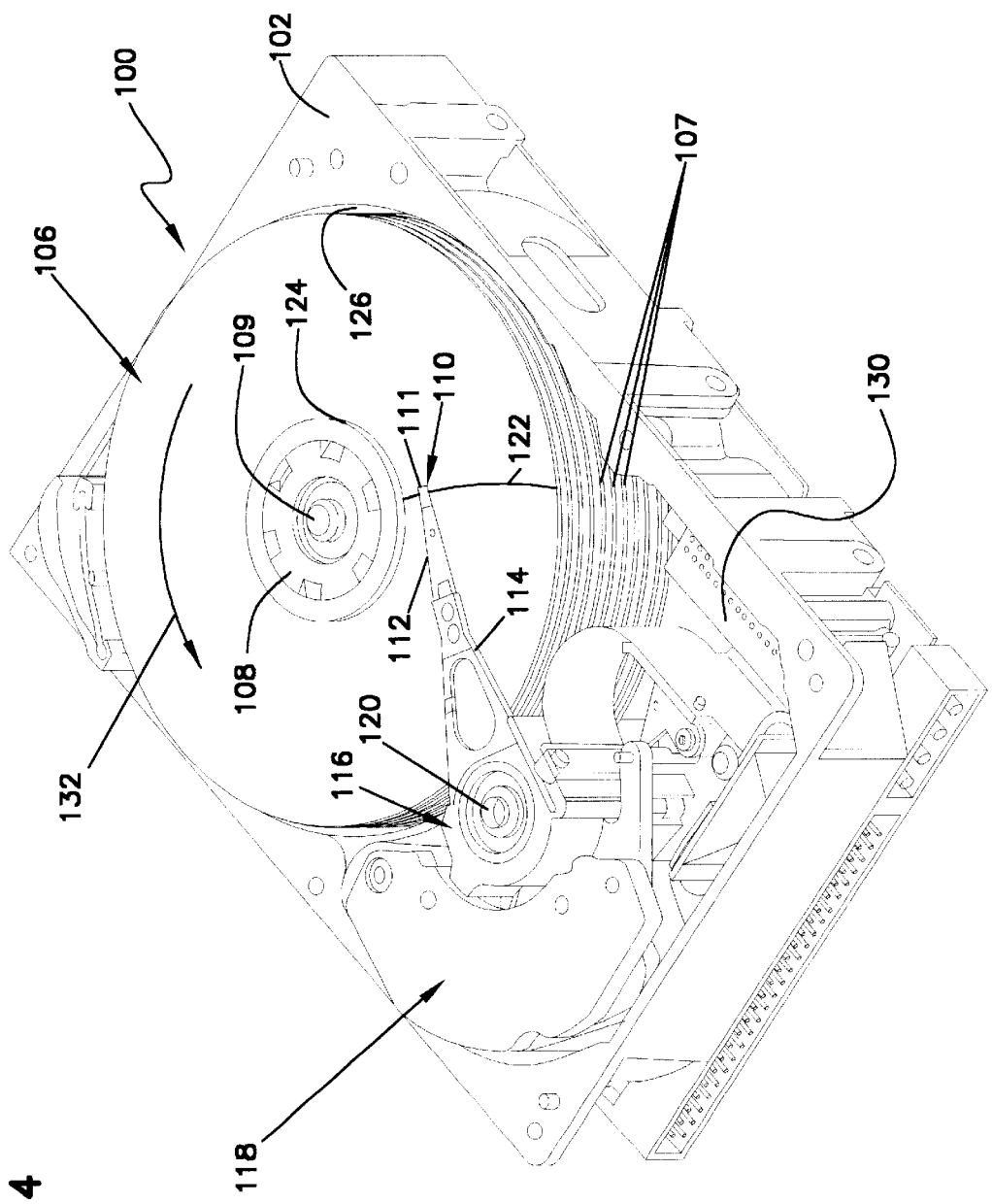
FIG. 4 is a perspective view of a disc drive in which aspects of the present invention may be practiced.

FIG. 4 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head 111 arranged to write data to, and read data from, concentric tracks on the confronting disc surface. In the example shown in FIG. 4, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position the heads over a desired data track between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

The present invention is directed to a robust repetitive learning compensator (RLC) in the servo electronics included on circuit board 130. The RLC of the present invention addresses the repetitive disturbances, and particularly the repeatable runout (RRO).

Figure 5:
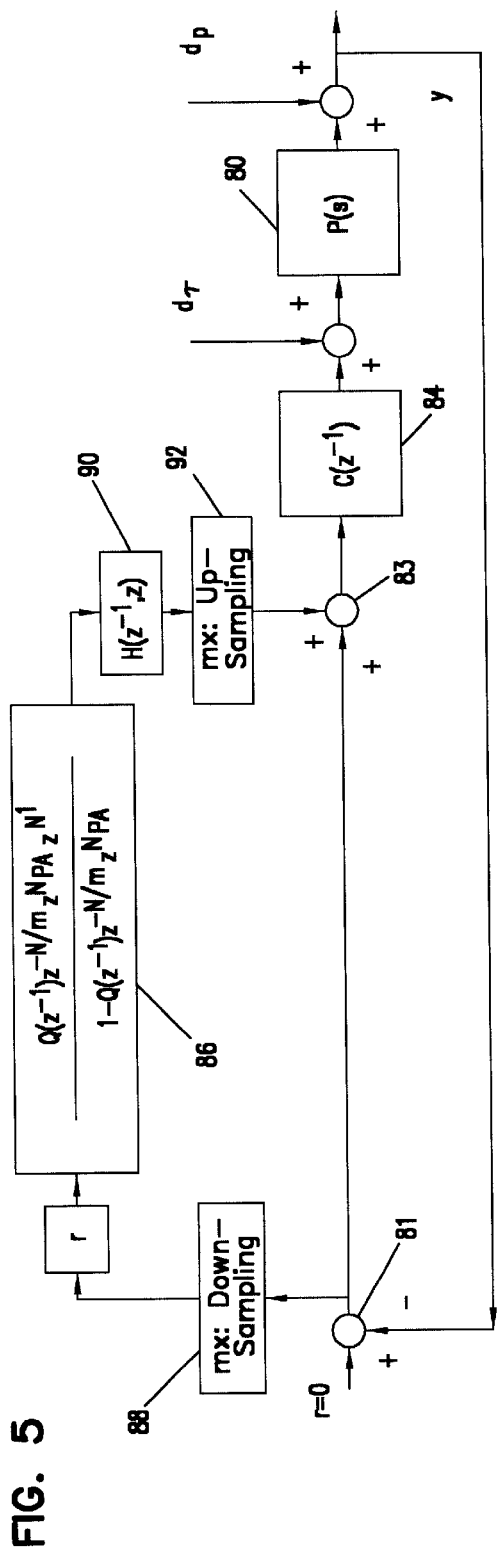
FIG. 5 is a schematic diagram of a model of a repetitive learning compensator according to the present invention.

FIG. 5 illustrates an RLC according to one embodiment of the present invention. The RLC includes a learning filter 86 placed before feedback controller 84. The error signal is first down-sampled by sampler 88 at a sampling frequency of $f_s/m$, where m is a parsing factor. Hence, down-sampler 88 samples the error signal at a sampling frequency that is reduced from the sample frequency $f_s$ of the servo system by a factor based on the parsing factor m. The signal is applied to learning 86 and to zero-phase filter 90 and up-sampled at 92 by the same parsing factor m, so the signal applied to the feedback controller 84 is at the servo sample frequency $f_s$.

The up-sampling block 92 may be any general form of holder to convert the sampling frequency of $f_s/m$ to $f_s$, but a zeroth-order or first-order holder are most preferred. Other general-order holders can be employed for up-sampling, but the benefit gained may be limited.

As previously described, learning filter 86 includes a Q-filter and a memory buffer that serves as a delay line to provide positive feedback. In the prior art, the size (bit-length) of the memory buffer was set to N and was directly proportional to the sample frequency $f_s$ that was applied to the filter. In the present invention, the reduction of the sample frequency to $f_s/m$ permits the size of the memory buffer to be reduced to N/m. It will be appreciated that N is an integer number (equal to the number of servo sectors on a track of the disc medium) and that N/m is also an integer number (representing the number of bit positions in the memory buffer of filter 86). Consequently, m is an integer greater than 1 that is divisible into N to produce an integer result. For example, for a disc drive having 144 servo sectors on each track, m could be 1.5, 2, 3, 4.5, 5, etc. In any case, the size of the memory buffer is reduced. Since buffer size is a limiting factor on the speed of operation of the RLC, reduction of the memory buffer increases the speed of the RLC.

Figure 1:
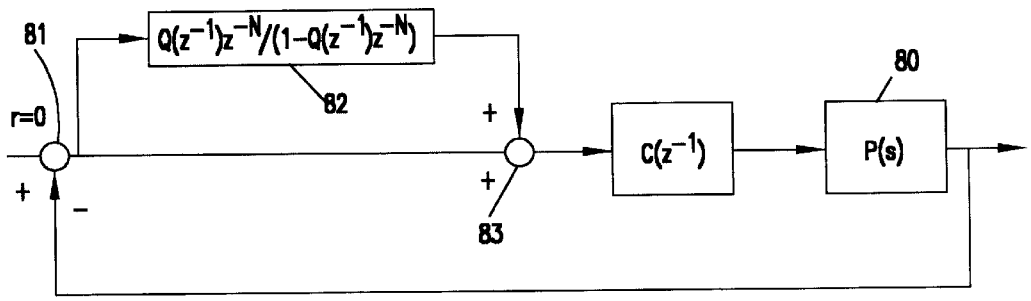
FIGS. 1–3 are schematic diagrams of models of repetitive learning controls found in the prior art.
Figure 2:
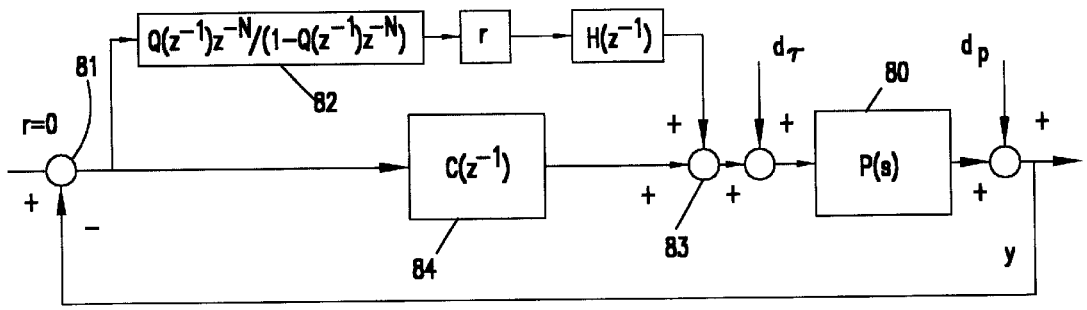
Figure 3:
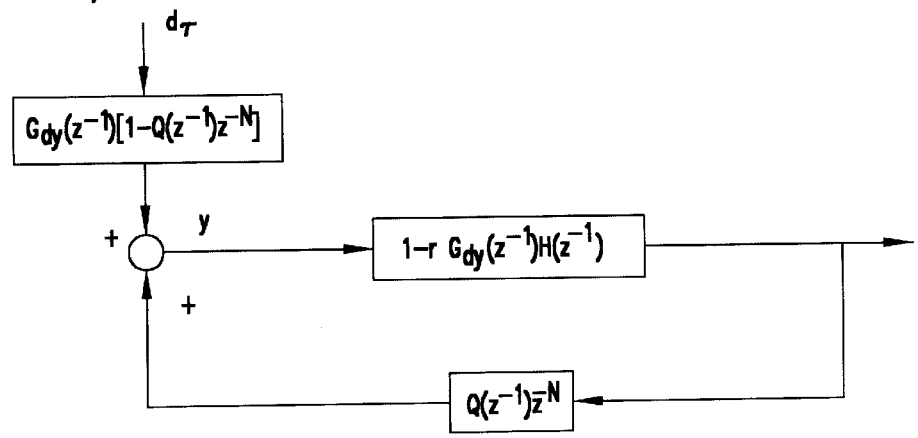
Figure 6:
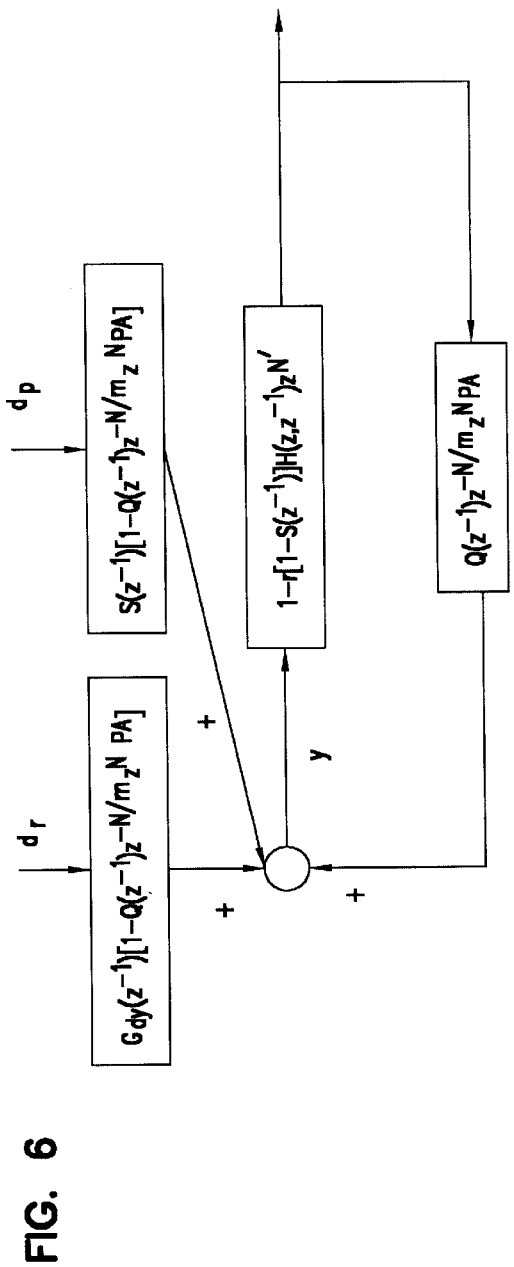
FIG. 6 is a diagram of a model of the stability condition of the repetitive learning compensator shown in FIG. 5.

As described above, prior art filter 82 (FIGS. 1 and 2) is modeled as $$\frac{Q(z^{-1})z^N}{1 - Q(z^{-1})z^N};$$

where N is based on the sample frequency. Learning filter 86 of the present invention is modeled as $$\frac{Q(z^{-1})z^{N/m}z^{N_{PA}}z^{N'}}{1 - Q(z^{-1})z^{N/m}z^{N_{PA}}},$$

where $N_{PA}$ is a phase advance to correct drift of the harmonic frequencies of the fundamental frequency, N' is a phase advance for the position error signal, and N/m is the size of the memory buffer (m being the parsing factor). The repetitive learning compensator of the present invention is characterized as a parsimonious repetitive learning compensator (PRLC), whose degree of parsimonious is based on the parsing factor m. There are four tuning knobs for stabilizing the PRLC. FIG. 6 is a model of the stability of the PRLC applying the small gain theorem.

One tuning knob for filter 86 is the adjustment of the learning gain γ to adjust the disturbance rejection capability. More particularly, a larger gain γ will increase the comb teeth to reject selected frequencies. A second tuning knob is the adjustment of the phase advance for phase error N'. A third tuning knob is the adjustment of the sensitivity function $S(z^{-1})$. The sensitivity function is a tuning knob because different degrees of parsimoniousness (different parsing factors m) results in different equivalent sensitivity functions $S(z^{-1})$. The fourth tuning knob is the smoothing filter 90 and the adjustment of $H(z^{-1},z)$.

The Q-filter in learning filter 86 is an important tuning knob but is fixed to minimize a "fundamental frequency drift" problem using the phase advance $N_{PA}$ to correct the peak frequency drift. Therefore, learning filter 86 and $N_{PA}$ are not considered as tuning knobs for the PRLC stability tuning.

Figure 7:
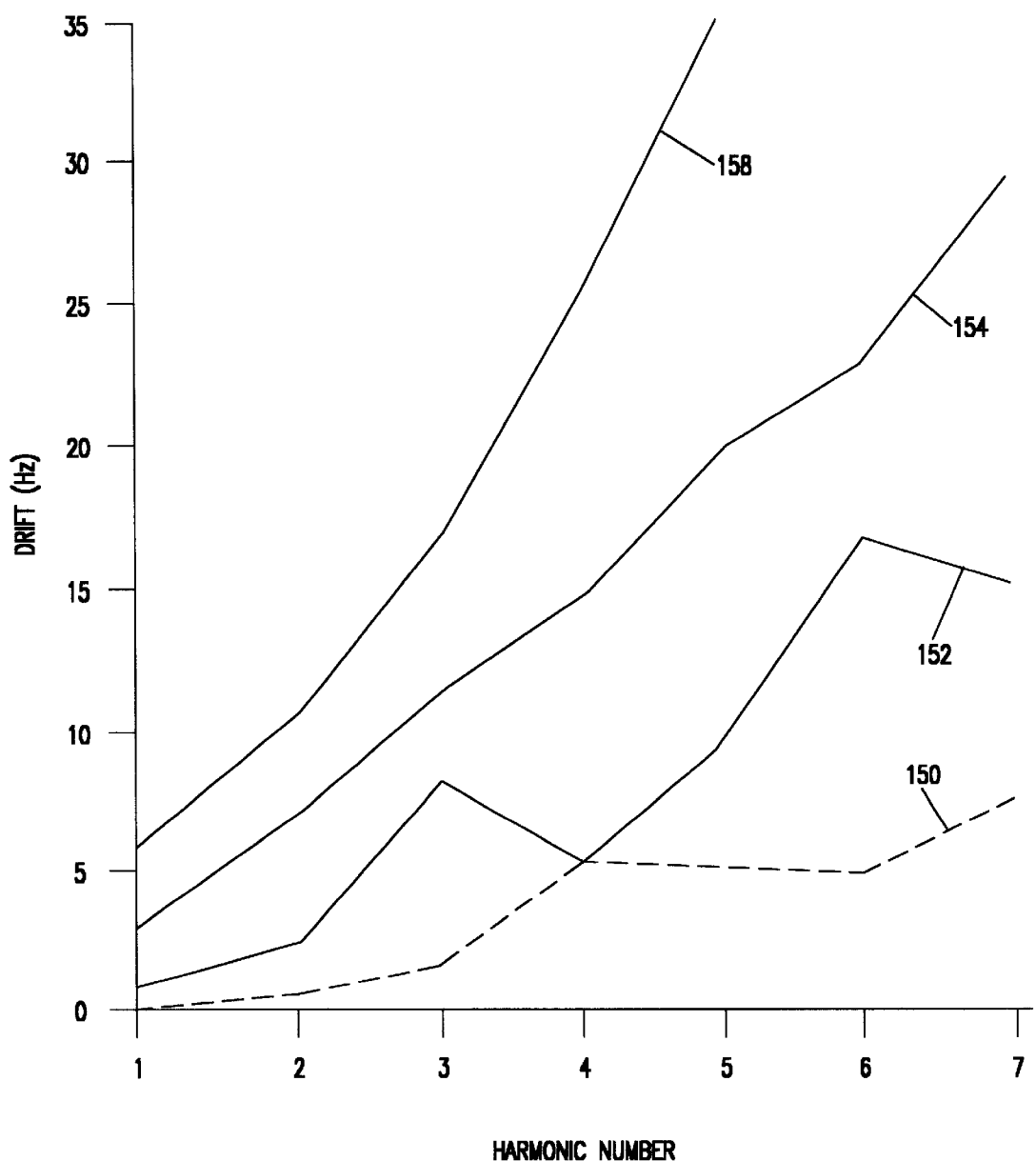
FIG. 7 is a graph illustrating the effect of different memory buffer sizes for the repetitive learning compensator of FIG. 5.

The fundamental frequency drifts as the order of harmonics goes higher. Additionally, as the parsing factor increases, increased drifting of the fundamental frequency has been observed. Considering a disc drive having 144 sectors and a sampling frequency of 12970 Hz. The fundamental frequency is 12970/144=90.0694 Hz. If the sampling factor m is four (4×degree of parsimoniousness), then the actual memory size is reduced by four (144/4=36). FIG. 7 is a graph illustrating the effect of various sampling factors m, with $H(z^{-1},z)=1$, N'=0 and $N_{PA}=0$ and a cutoff frequency $f_c$ of 1.6 KHz. Peak frequencies for various harmonics were measured for different sampling factors m from the bode plots. The frequencies at the peaks should be close to the ideal harmonic frequencies: 90.0694 Hz, 180.1389 Hz, 270.2083 Hz, 360.2778 Hz, 450.3472 Hz, 540.4167 Hz, and 630.4861 Hz. As shown in FIG. 7, drifts were observed, and were observed to increase as the order of harmonics increases. Moreover, drift increases as the degree of parsimoniousness (parsing factor m) increases. More particularly curve 150 shows peak frequency drift at harmonics one through seven where m=1 (without reduction of the sample frequency). Curve 150 shows peak frequency drift from the ideal harmonic frequencies between about 0.0 Hz (at the fundamental frequency, or first harmonic) to about 7.5 Hz at the seventh harmonic. With m=2, (sample frequency reduced by 2) curve 152 shown the drift between about 1.0 Hz and 15.3 Hz. With m=4, (sample frequency reduced by 4) curve 154 shows the drift between about 3 and 29 Hz. With m=8, (sample frequency reduced by 8) the drift was between about 6 and 35 Hz to the fifth harmonic, as shown by curve 156.

The graph of FIG. 7 is based on use of a zeroth order holder. It was found that use of first order holders did not materially improve drift. Therefore, it is speculated that increasing the order of the holder will not materially improve drift.

Equation 4 demonstrates that the transfer function of the RLC has peaks centered on the harmonic frequencies of the fundamental frequency. However, these peaks behave differently for different cutoff frequencies ($f_c$) and different phase advances ($N_{PA}$) for correction of the drift of the fundamental frequency harmonics. Consequently, the goal is to identify the best pair of $f_c$ and $N_{PA}$ to maximize performance:

$$\max_{\omega_c, N_{PA}} J(\omega_c, N_{PA}) = \sum_{k=1}^{M_0} |G_r(j\omega_k, \omega_c, N_{PA})|, \quad [7]$$

where $M_0$ is the integer number of harmonics concerned and $\omega_c = 2\pi f_c$. Normally, the optimization of $f_c$ and $N_{PA}$ can be achieved where $6 \leq M_0 \leq 10$. The optimum values for $f_c$ and $N_{PA}$ can be found by plotting $J(\omega_c, N_{PA})$ against frequency for different values of $N_{PA}$. More particularly, for each value of $N_{PA}$, a searching algorithm identifies an optimal cutoff frequency $f_c$.

Figure 8:
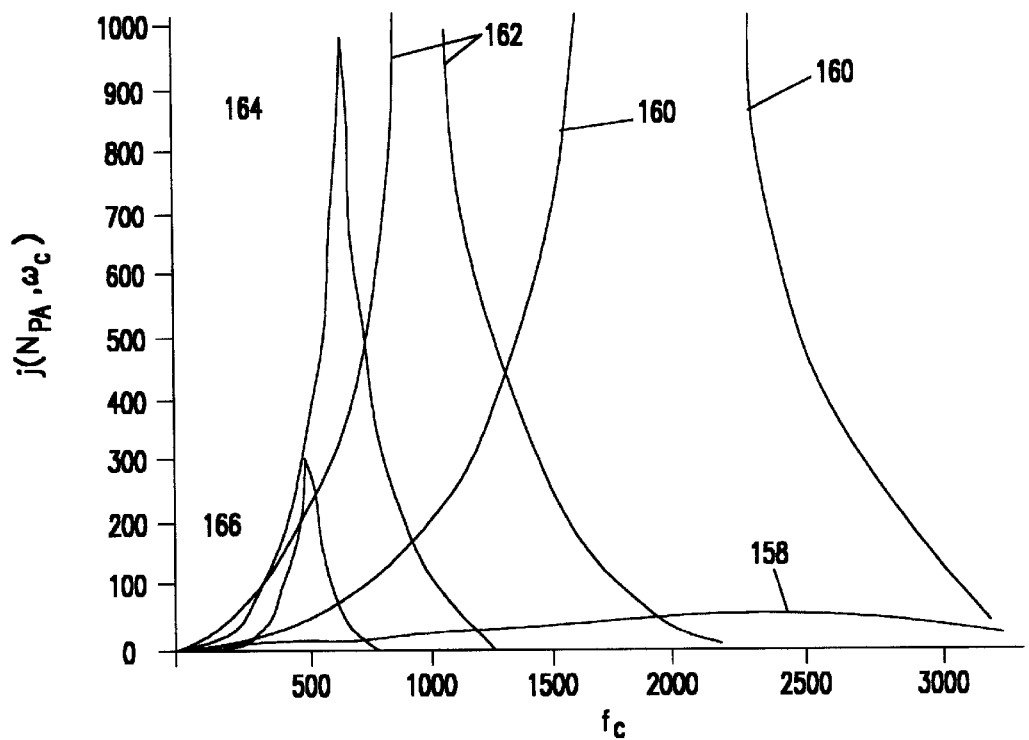
FIGS. 8 and 9 are graphs illustrating the optimizing of certain parameters of the repetitive learning compensator shown in FIG. 5.
Figure 9:
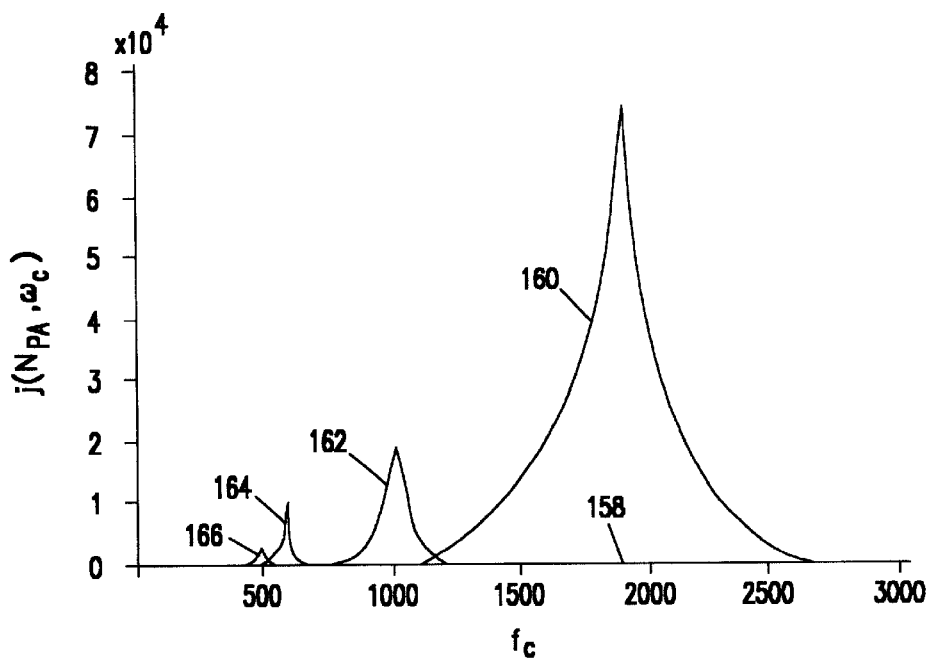

For the disc drive example described above, the graph of FIG. 8 plots the values of $J(\omega_c, N_{PA})$ (to a maximum of $10^3$) against cutoff frequency $f_c$ for values of $N_{PA}$ of 0 (curve 158), +1 (curve 160), +2 (curve 162), +3 (curve 164) and +4 (curve 166). FIG. 9 is a graph of the same plots as in FIG. 8, with the ordinate expanded to $8 \times 10^4$. As shown by curve 124 in FIGS. 8 and 9, a significant peak of 75369.6 in the value of $J(\omega_c, N_{PA})$ in the $N_{PA}=1$ curve at $f_c=1914.98$ Hz. Additional curves representing measurements taken for $N_{PA}$ equal to −1 and −2 (where they represent phase delays, rather than phase advancement) are not shown. In both cases of a negative value of $N_{PA}$, the plot results showed worse values for $J(\omega_c, N_{PA})$ within reasonable values of the cutoff frequency $f_c$. The results of FIGS. 8 and 9 are summarized in Table 1. Table 2 summarizes the results for different RLC gains γ and phase advances N'.

TABLE 1

| $N_{PA}$ (steps) | $J(\square_c, N_{PA})$ | $f_c$ (Hz) | Q-filter $a_1$ | Q-filter $b_1$ | Q-filter $a_1$ Q16 | Q-filter $b_1$ Q14 |
|---|---|---|---|---|---|---|
| 2 | 4860.34 | 1012.72 | 0.2002 | 0.5996 | 13120 | 9824 |
| 1 | 75369.6 | 1914.98 | 0.3334 | 0.3331 | 21850 | 5458 |
| 3 | 1008.28 | 683.476 | 0.1432 | 0.7137 | 9385 | 11693 |
| 4 | 339.95 | 515.137 | 0.1114 | 0.7771 | 7301 | 12732 |

TABLE 2

| γ | N' | $f_c$ (Hz) | $J(\square_c, N_{PA})$ |
|---|---|---|---|
| 0.25 | 1 | 1914.98 | 75369.6 |
| 0.5 | 1 | 1914.99 | 299910 |
| 0.75 | 1 | 1914.99 | 673626 |
| 0.25 | 0 | 1914.99 | 75376.3 |
| 0.5 | 0 | 1914.99 | 299923 |
| 0.75 | 0 | 1914.99 | 673646 |
| 0.25 | 2 | 1914.97 | 75357 |
| 0.5 | 2 | 1914.98 | 299885 |
| 0.75 | 2 | 1914.99 | 673589 |

When $N_{PA}$ is 0, frequency drift gets better by increasing $f_c$. While it would seem that with $N_{PA}=0$, $f_c$ should be set very high to achieve an optimal value for $J(\omega_c, N_{PA})$. However, the Q-filter is a low pass filter and cannot have a high cutoff frequency. When $N_{PA}$ is 1, there is a large peak corresponds to an optimal $f_c$. When $N_{PA}$ is set to 2 or 3, a peak exists with a corresponding optimal $f_c$, but the peak is much smaller than the case when $N_{PA}$ is 1. This means the optimal choice of $N_{PA}$ is 1, and its corresponding optimal cutoff frequency $f_c$ is 1914.98 Hz. A negative $N_{PA}$, i.e. a phase delay rather than a phase advance, is clearly not optimal.

The phase advance for position error signals (N') and learning gain γ are selected empirically from Bode charts based on various combinations of integer values of N' and gain values for γ. Typically, the empirical selection of N' and γ is accomplished from a small number of Bode plots. More particularly, small gains tend to reduce the comb peak values of filter 86 thereby reducing attenuation of noise due to repeatable runout. Consequently, the learning gain γ should be as close to unity as practical. Likewise, in most cases the number of selections of candidate values for N' is small, usually $1 \leq N' \leq 4$. Consequently, the empirical selection of N' and γ is readily accomplished without large numbers of Bode plots. For example, there are only four choices for N' where $1 \leq N' \leq 4$. If there are three choices for γ (e.g., if γ is 1.0, 0.75 and 0.50), the total number of Bode plots is a manageable twelve.

The several Bode plots (twelve in the example) are compared to identify the Bode chart providing the largest stability region. The values of N' and γ associated with the identified Bode chart are selected for tuning the filter. While the present invention employs Bode plots for identifying transfer functions and other characteristics of the PRLC, other techniques may be employed, such as error transfer function and 1+PC.

The value of m may be verified by fitting measured frequency response data to a discrete-time model using the original sampling frequency $f_s$. The discrete-time model is converted to a continuous-time model using the original sampling frequency $f_s$. The continuous-time model is then converted to a discrete-time model at a new sampling frequency that is one-half the original sampling frequency $f_s/2$. The frequency response of the new sensitivity function is then reviewed to verify the optimally chosen parameters.

Figure 10:
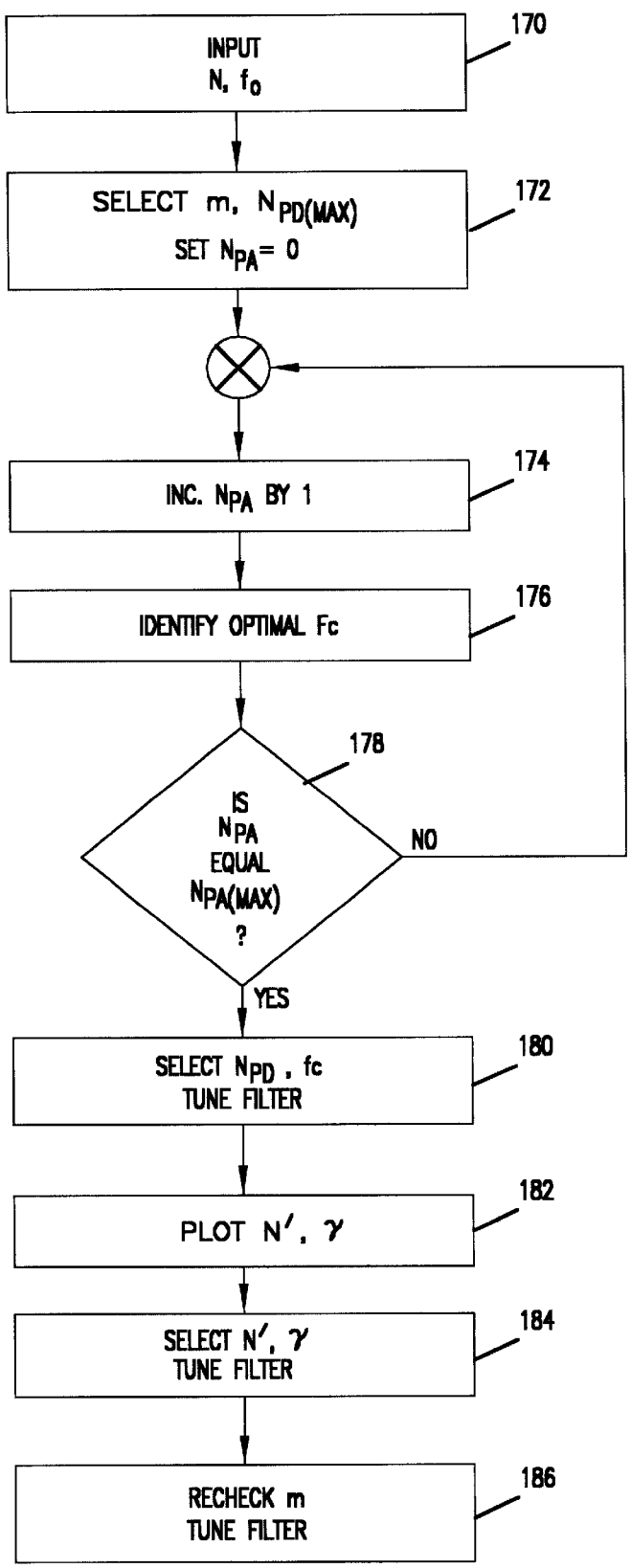
FIG. 10 is a flow diagram illustrating the process of designing a repetitive learning compensator according to the present invention.

FIG. 10 is a flow diagram illustrating a process for tuning learning filter 86 (FIG. 4). The values of N and $f_0$ are identified at step 170 based on the disc drive for which the parsimonious repetitive learning compensator is to operated. More particularly, N is the number of servo sectors in a track on the disc, and $f_0$ is the fundamental frequency of the spindle motor of the disc drive. At step 172, a maximum value $N_{PA(max)}$ is selected as the maximum integer for $N_{PA}$. An value for m is selected that is greater than 1 and N/m is an integer. The system is initialized by setting $N_{PA}$ to 0. The process commences at step 174 by incrementing $N_{PA\ by}$ 1 (which, in the first iteration of the process sets $N_{PA}$ to 1). At step 176, the optimum cutoff frequency $f_c$ is identified for the $N_{PA}$ value under test. At step 178, if the $N_{PA}$ value equal the maximum value $N_{PA(max)}$, the process continues to step 180. If at step 178, the $N_{PA}$ value has not reached the maximum value, the process loops back to step 174 to increment the value of $N_{PA}$ and identify an optimum cutoff frequency $f_c$ associated with the new value of $N_{PA}$. The process continues looping and identifying optimum cutoff frequencies $f_c$ for each $N_{PA}$ value until the maximum value $N_{PA(max)}$ is reached at step 178.

At step 180, the $N_{PA}$ value and the associated optimum cutoff frequency $f_c$ that operated the learning filter to the maximum transfer function are selected and the learning filter is tuned with the selected $N_{PA}$ value and optimum cutoff frequency $f_c$.

At step 182, the filter is tuned with various values of for the phase advance for the position error signal N' and the learning gain γ. More particularly, integer values of N' are selected between 1 and 4 ($1 \leq N' \leq 4$) and values of the learning gain are selected (e.g., 1.0, 0.75, 0.50). Bode plots are made (at least electronically) of the stability of the filter for various combinations of N' and γ at the regions of stability for each of the Bode plots are examined. At step 184, the values of N' and γ that produced the Bode plot with the largest region of stability are selected and the tuning of the filter is adjusted. At step 186, the filter may be re-tested to verify the value of m.

The present invention provides for the design of a parsimonious repetitive learning compensator for a disc drive having a known sampling frequency $f_s$, spindle or fundamental frequency $f_0$, and Bode plot. To perform a design according to the present invention the length N/m of the memory buffer in learning filter 86 is selected, where N is the traditional length and m is the parsing factor for the degree of parsimoniousness. The optimal phase advance, $N_{PA}$, and the optimal cutoff frequency, $f_c$, of the Q-filter are selected by identifying the maximum transfer function $J(\omega_c, N_{PA})$ for the Q-filter achieved by pairs of $N_{PA}$ and $f_c$. The learning gain, γ, and additional phase advance, N', of the position error signal are selected empirically. The zero phase smoothing filter 90 is designed to increase robustness.

Only minimal knowledge is required for design of filters according to the present invention, and the design process minimizes the use of models. Only one learning gain γ needs to be designed. Moreover, the parsing factor m sets a degree of parsimonious for the repetitive learning compensator thereby reducing memory size and computational cost by a factor of m.

While the Q-filter introduces peak frequency drift, a phase advance ($N_{PA}$) is employed to correct the peak frequency drift. The phase advance is selected by identifying the one optimal cutoff frequency $f_c$ of the Q-filter for each candidate phase advance, and finding the pair of phase advance $N_{PA}$ and cutoff frequency $f_c$ that maximizes the spectrum energy at the ideal harmonic frequencies.

The invention also increases robustness of the repetitive learning compensator by introducing an additional phase advance (N') for the error signal. The zero-phase smoothing filter 90 and a zeroth- or first-order holder in the up-sampler 92 further improve performance.

Stated alternatively, the present invention provides a repetitive learning compensator (FIG. 5) for the servo system of disc drive 100. Disc drive 100 has a rotatable storage medium 106 that is rotated by a motor having a frequency of rotation $f_0$. Disc drive 100 also includes an actuator system 116 operated by the servo system for positioning a head 111 relative to the storage medium 106. The storage medium contains a plurality of concentric tracks each containing N servo sectors. The servo system is responsive to position error signals from head 111 to modify servo signals r based on a position of the head relative to the storage medium. The repetitive learning compensator includes a learning filter 86 having a memory buffer having a length N/m where m is a number greater than 1 representing a parsing factor and N/m is an integer. Down sampler 88 supplies the modified servo signals to learning filter 86 at a frequency of $f_s/m$, where $f_s$ is the sampling frequency. Up sampler 92 supplies filtered signals to voice coil motor 118 of actuator assembly 116 at the sampling frequency $f_s$.

The invention also provides for attenuating of error signals in a servo signal recovered from servo sectors in tracks on storage medium 106, the tracks having N servo sectors. The servo signal is recovered at a sample frequency $f_c$. The servo signal is down-sampled by down-sampler 88 at a frequency equal to fc/m, where m is a parsing factor greater than 1 and N/m is an integer. The down-sampled servo signal is filtered with a memory buffer 86 having a length of N/m bits to attenuate error signals in the servo signal. The filtered servo signal is up-sampled by up sampler 92 to the sample frequency $f_c$.

The invention also provides a process for designing the repetitive learning compensator of FIG. 5 for a servo control of disc drive 100. The number of servo sectors N in a track of the disc drive is identified. A parsing factor is selected as a number m greater than 1. The memory buffer of learning filter 86 has a length equal to N/m, where N/m is an integer. Learning filter 86 is tuned by selecting a plurality of phase change integers $N_{PA}$ that operate to alter a phase of the memory buffer. An optimal cutoff frequency $f_c$ for the Q-filter is identified for each $N_{PA}$. The learning filter is tuned with the phase change integer and corresponding optimal cutoff frequency producing the greatest transfer function amplitude at the harmonic frequencies for the learning filter. Preferably, a plurality of position error phase change integers N' associated with the position error signals and a plurality of learning gains γ for the learning filter are selected. A plurality of stability curves are plotted for the Q-filter based on the selected pluralities of position error phase change integers and learning gains. Learning filter 86 is tuned with the position error phase change integer and the learning gain associated with the curve having the largest stability region.

Although the present invention has been described with reference to servo systems for disc drives, those skilled in the art will recognize that the present invention may be practiced with other systems employing filter controls having repeatable runout.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the parsimonious repetitive learning compensator while maintaining substantially the same functionality without departing from the scope and spirit of the present invention. Thus, while the invention is described in connection with the use of Bode plots to perform some aspects of the process, the process of might be accomplished using other techniques, such as error transfer function and 1+PC. Moreover, while the invention is described in connection with physical plots and graphs, those skilled in the art will recognize that electronic simulations and computer-assisted design procedures may be employed. In addition, although the invention is described herein is directed to rotatable disc drives, it will be appreciated by those skilled in the art that the teachings of the present invention can be applied to linear devices, including tape drives, where repeatable runout exists, without departing from the scope and spirit of the invention.

What is claimed is:

1. A servo system for a disc drive having a storage medium and an actuator assembly positioning a head relative to the storage medium, the servo system comprising:
    a servo feedback loop for applying servo signals to the actuator assembly and for modifying the servo signals based on a position of the head; and
    means responsive to the modified servo signals for attenuating repeatable runout error signals in the modified servo signals.

2. The servo system of claim 1, wherein the means for attenuating error signals comprises a parsimonious repetitive learning compensator.

3. The servo system of claim 2, wherein the parsimonious repetitive learning compensator includes:
    a memory buffer having a length N/m where N is an integer number of servo sectors in a track on the storage medium and m is a number greater than 1 representing a parsing factor so that N/m is an integer.

4. The servo system of claim 3, wherein the repetitive learning compensator is tuned with a phase change represented by $N_{PA}$ and a cutoff frequency $f_c$, $N_{PA}$ and $f_c$ being selected as a pair providing a greatest transfer function magnitude for the repetitive learning compensator.

5. The servo system of claim 4, wherein the repetitive learning compensator is further tuned to a learning gain γ and with a phase change for position error represented by N', and γ and N' are selected empirically from plotted stability regions associated with pluralities of γ and N'.

6. The servo system of claim 5, wherein $1 < m \leq 4$, $1 \leq N_{PA} < 4$ and $1 \leq N' \leq 4$.

7. The servo system of claim 3, wherein the parsimonious repetitive learning compensator further includes:
    a down sampler for supplying the modified servo signals to the repetitive learning compensator at a frequency of $f_s/m$, where $f_s$ is a sampling frequency based on movement of the storage medium; and
    an up sampler for supplying filtered signals from the repetitive learning compensator to the actuator assembly at the sampling frequency $f_s$.

8. A repetitive learning compensator for a servo system of a disc drive having a rotatable storage medium that is rotated by a motor having a frequency of rotation $f_0$ and an actuator system operated by the servo system for positioning a head relative to the storage medium, the storage medium containing a plurality of concentric tracks each containing N servo sectors, the servo system being responsive to position error signals from the head to modify servo signals based on a position of the head relative to the storage medium, the repetitive learning compensator comprising:
    a memory buffer having a length N/m where m is a number greater than 1 representing a parsing factor and N/m is an integer;
    a down sampler for supplying the modified servo signals to the repetitive learning compensator at a frequency of $f_s/m$, where $f_s$ is a sampling frequency based on $f_0$; and
    an up sampler for supplying filtered signals from the repetitive learning compensator to the actuator assembly at the sampling frequency $f_s$.

9. The repetitive learning compensator of claim 8, wherein the repetitive learning compensator is further tuned to a learning gain γ and with a phase change for position error represented by N', and γ and N' are selected empirically from plotted stability regions associated with pluralities of γ and N'.

10. The repetitive learning compensator of claim 8, wherein the repetitive learning compensator is tuned with a phase advance represented by $N_{PA}$ and a cutoff frequency $f_c$, where $N_{PA}$ and $f_c$ are selected as a pair to provide a greatest transfer function magnitude for the repetitive learning compensator.

11. The repetitive learning compensator of claim 8, wherein $1 < m \leq 4$ and $1 \leq N_{PA} \leq 4$.

12. A process of attenuating error signals in a servo signal recovered from servo sectors on a storage medium at a sample frequency $f_c$, the storage medium having at least one recording track having N servo sectors, the process comprising steps of:
    (a) down-sampling the servo signal at a frequency equal to fc/m, where m is a parsing factor greater than 1 and N/m is an integer;
    (b) digitally filtering the down-sampled servo signal with a memory buffer having a length of N/m bits to attenuate error signals in the servo signal; and (c) up-sampling the filtered servo signal to the sample frequency $f_c$.

13. The process of claim 12, wherein an actuator assembly is responsive to the servo signals to position a head adjacent the storage medium, and the process further includes a step of:

(d) applying the up-sampled servo signal to the actuator assembly.

14. The process of claim 12, wherein $1 < m \leq 4$.

15. A process of designing a repetitive learning compensator for a servo control of a disc drive having a rotatable storage medium and an actuator assembly positioning a head relative to the storage medium, the storage medium having concentric tracks containing servo sectors, the process comprising steps of:

(a) identifying a number of servo sectors N in a track and a frequency based on a rate of rotation of the storage medium;

(b) selecting a number m greater than 1 as a parsing factor; and (c) providing a memory buffer having a length equal to N/m, where N/m is an integer.

16. The process of claim 15, wherein $1 < m \leq 4$.

17. The process of claim 15, wherein the repetitive learning compensator further inlcudes a Q-filter and the process includes the step of (d) tuning the repetitive learning compensator by performing steps of:

(i) selecting a plurality of phase change integers $N_{PA}$ that operate on the repetitive learning compensator to alter a phase of the repetitive learning compensator, (ii) identifying an optimal cutoff frequency $f_c$ for the Q-filter for each $N_{PA}$, and (iii) tuning the Q-filter with the phase change integer and corresponding optimal cutoff frequency producing a greatest transfer function magnitude for the repetitive learning compensator.

18. The process of claim 17, wherein $1 \leq N_{PA} \leq 4$.

19. The process of claim 17, wherein the servo system is designed to be responsive to position error signals from the actuator assembly to supply modified servo signals to the repetitive learning compensator, and step (d) further includes, after step (iii), steps of:

(iv) selecting a plurality of position error phase change integers N' associated with the position error signals, (v) selecting a plurality of learning gains γ for the repetitive learning compensator, (vi) plotting a plurality of stability curves for the repetitive learning compensator based on the selected pluralities of position error phase change integers and learning gains, and (vi) tuning the repetitive learning compensator with the position error phase change integer and the learning gain associated with the curve having the largest stability region.

20. The process of claim 19, wherein $1 \leq N' \leq 4$.

* * * * *